United States Patent

[11] 3,561,331

| [72] | Inventor | Jacob E. Feucht |
| | | 321 Van Demark Road, Sidney, Ohio 45365 |
| [21] | Appl. No. | 847,839 |
| [22] | Filed | Aug. 6, 1969 |
| [45] | Patented | Feb. 9, 1971 |

[54] CONNECTING MEANS FOR A CYLINDER AND INTERNAL MEMBER
8 Claims, 6 Drawing Figs.

[52] U.S. Cl. .................................................. 92/128, 92/165; 173/36
[51] Int. Cl. ........................................................ F01b 29/00, F16j 15/18, F21c 11/00
[50] Field of Search .......................................... 173/34, 36, 132; 287/52.04, 52.06, 52.09, 53; 70/381; 308/236; 385/138, 141, 332, 128; 92/171, 165; 103/216

[56] References Cited
UNITED STATES PATENTS

| 738,445 | 9/1903 | Hoffmann | 287/52.06 |
| 2,610,515 | 9/1952 | Williams | 287/52.06 |
| 2,689,547 | 9/1954 | Pearson | 173/36 |
| 2,955,572 | 10/1960 | Feucht et al. | 173/36 |
| 3,009,747 | 11/1961 | Pitzer | 287/52.09 |
| 3,051,514 | 8/1962 | Consolloy | 285/215 |
| 3,450,421 | 6/1969 | Harwell, Jr. | 285/321 |

*Primary Examiner*—James A. Leppink
*Attorney*—James E. Nilles

ABSTRACT: A tapered retaining ring for locking a generally annular member within a hollow cylinder. The ring fits in and is held by a shallow groove on the internal surface of the cylinder and the ring has an internal taper. The generally annular member to be locked within the cylinder has a complementary external taper that slides into the retaining ring and causes the latter to radially expand into locking position.

PATENTED FEB 9 1971
3,561,331
SHEET 1 OF 3
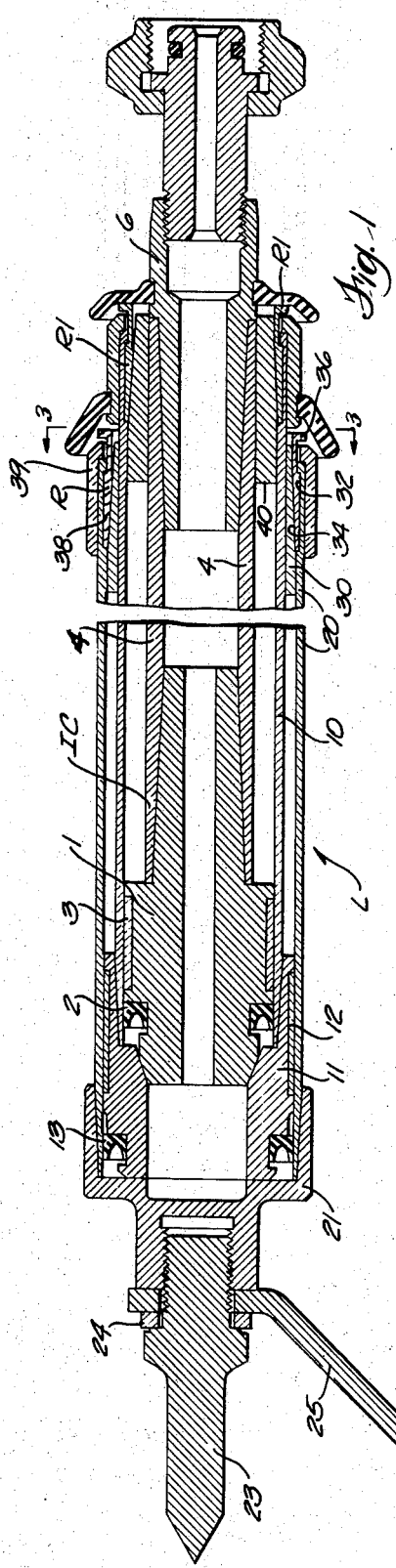
Inventor:
Jacob E. Feucht
By: James E. Nilles
Attorney

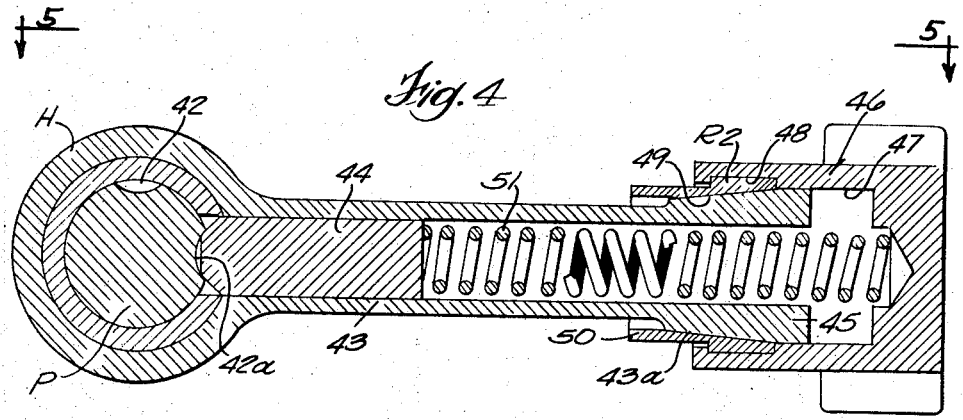
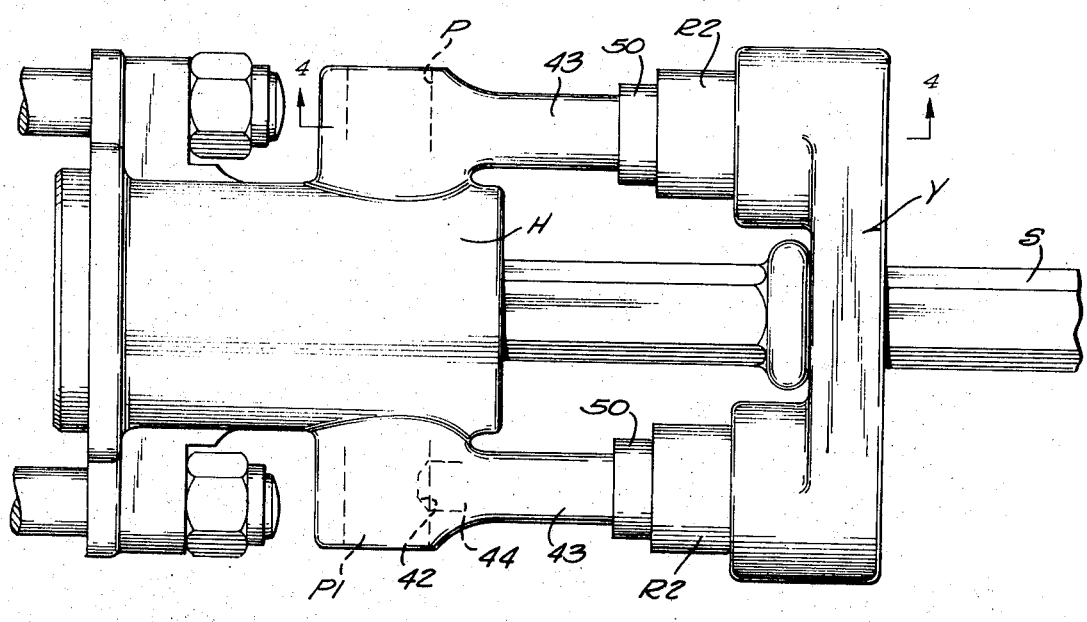

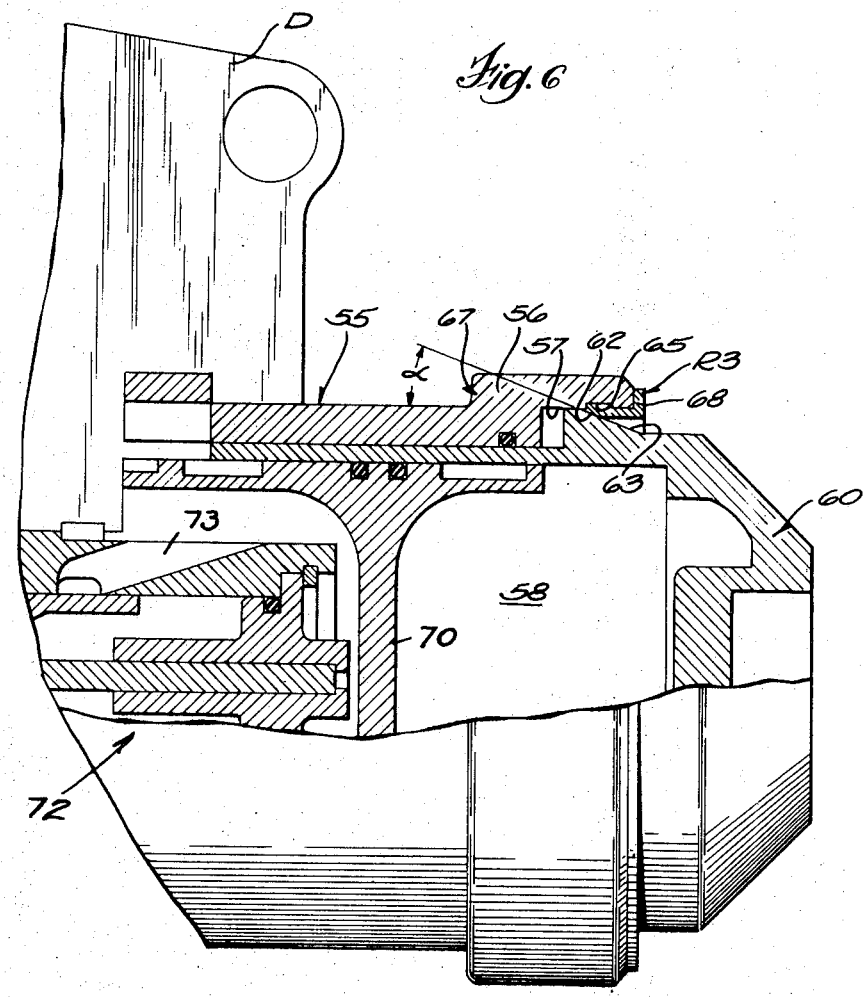

3,561,331

CONNECTING MEANS FOR A CYLINDER AND INTERNAL MEMBER

BACKGROUND OF THE INVENTION

This invention relates to connecting means such as a retaining ring for locking a member to a cylinder. These locking devices generally have included sleeves of either single or multiple part construction, split rings of tapered configuration, or other intermediate locking devices between a hollow cylinder and the part to be locked therein.

Prior art devices have been proposed for locking these bushings in the cylinder, for example, threaded joints, but these devices have required complex and expensive packing, created problems in maintaining concentricity tolerances, were difficult to assemble and disassemble, and did not lend themselves to the use of various materials which could not be suitably threaded.

The prior art has also utilized split, tapered rings to hold another member on a shaft. Examples of such prior art devices are shown in the U.S. Pat. No. 738,445, issued Sept. 8, 1903 and entitled "Device for Securing Parts to Shafts", where a threaded nut is required to draw the part onto the tapered ring, the nut also being required to hold the sleeve axially on the shaft.

Other examples of the prior art is U.S. Pat. No. 3,180,164, issued Apr. 27, 1965 entitled "Variable Speed Sheave" which also uses a threaded construction to hold the taper member in place. U.S. Pat. No. 3,051,514, issued Aug. 28, 1962, entitled "Connecting Means for a Cam Operating Split Contractible Sleeve" utilizes an inclined sheave which acts as a thread to hold the tapered piece in place.

Generally, in respect to the prior art, these patents utilize a mechanical fastener means to hold the tapered connecting means in place, and in many devices, the primary reason for the taper is simply to obtain alignment of one part to the other.

SUMMARY OF THE INVENTION

The present invention provides a connecting means for releasably holding an internal member in a hollow cylinder or the like. More specifically, a tapered retaining ring is provided for locking a generally annular and externally tapered member to the bore of a cylinder which has a groove therein. The ring has a tapered bore which complements the externally tapered member and the ring is adapted to fit in the groove of the cylinder bore and be held therein while the tapered member is forced into the tapered bore of the ring. This causes the ring to expand radially into binding engagement with the cylinder wall.

The present invention finds particular utility when used in a fluid-actuated cylinder mechanism, such as an air leg of a rock drill or the like. Such mechanisms have a cylinder in which a piston stem bushing must be held in place and the present invention provides an extremely efficient means for doing so by providing a tapered retaining ring that has an internal taper that is complementary to an external taper of the piston stem bushing. The interior wall of the cylinder has a shallow groove for removably holding the retaining ring in position where it can be wedgingly engaged by the piston stem bushing.

The tapered locking ring provided in such a rock drill construction holds the assembly intact with no possibility of parts loosening due to vibration. In fact, the action of the piston within the cylinder is such that it tends to drive the bushing into even tighter engagement with the tapered locking ring, particularly when the vibration of the rock drill percussion is added to this piston feeding force.

The invention lends itself to the use of fiberglass for the cylinder itself, eliminates the need for any threaded connections, results in a compact unit with simplified piston packing, substantially eliminates concentricity tolerance problems, and it is easily and quickly assembled and disassembled.

These and other objects and advantages of the invention will appear hereinafter as this disclosure progresses, reference being had to the accompanying drawings.

BRIEF DESCRIPTION OF THE DRAWINGS

FIG. 1 is a longitudinal cross-sectional view through a telescopic air-feed leg of a rock drill in which the present invention is embodied;

FIG. 2 is an enlarged, fragmentary, cross-sectional view of a portion of the leg shown in FIG. 1;

FIG. 3 is a transverse view of the retaining ring, the view being taken generally along the line 3—3 in FIG. 1;

FIG. 4 is a longitudinal cross-sectional view of a modification of the invention, the view being taken along line 4—4 in FIG. 5;

FIG. 5 is a view taken along line 5—5 in FIG. 4; and

FIG. 6 is a longitudinal cross-sectional view through an accumulator which shows another modification of the invention.

DESCRIPTION OF A PREFERRED EMBODIMENT

Referring more particularly to the embodiment of the invention as shown in FIGS. 1 to 3, this embodiment shows a telescopic air leg for a rock drill which incorporates the tapered retaining rings of the present invention and which are used to hold the piston bushings in both the outer cylinder and the intermediate cylinder. Thus, the invention has been shown as applied between several telescoping cylinders, but of course, the invention is equally applicable to a single retaining ring between two members.

The telescopic air-feed leg L as shown in FIG. 1 includes an inner cylinder assembly IC which is comprised of a piston head 1 having a U-cup packing 2 and a wear ring 3 around its periphery. The piston is fixed to the inner cylinder 4 and the latter at its other end is fixed to the head 6.

The leg also includes an intermediate cylinder 10 in which the piston slides, this intermediate cylinder being fixed to another piston head 11. Piston head 11 also has a wear ring 12 and a U-cup seal 13. An outer cylinder 20 has a lower end cap 21 fixed thereto and the intermediate piston 11 can reciprocate within the outer cylinder in the known manner. An air leg point 23 is threaded into the end cap 21, and a lock washer 24 holds it in assembled relationship along with the foot piece 25, in the known manner.

Referring now to the other end of the air leg, a bushing 30 is provided between the intermediate and outer cylinders and this bushing has an externally tapered portion which convergingly tapers away from the opposite end of the feed leg.

The bore 20a of the outer cylinder 20 has a rather shallow, annular groove 32 formed therearound and adjacent the end of the cylinder.

In accordance with the present invention, an internally tapered, retaining ring R is held in the groove 32 and its internal tapered surface 34 complements the external tapered surface 30a of the bushing 30. As shown in FIG. 3, this ring R is of the axially split type and is radially compressed slightly when it is to be inserted in the cylinder 20 so that it resiliently expands when it is seated in groove 32 to thereby be held in position in the cylinder. The ring R has an extension portion 35 including a radial flange 36. As shown in FIG. 3, two holes 37 are provided, one on each side of the axial split 38, whereby a hooked Tru-arc type of pliers, of conventional construction, can be used to grip the ring for radial compression and assembly in the cylinder.

An outer, top cap 39 has a slip fit over the outer cylinder 20, and this cap is particularly important if the outer cylinder is formed of a resilient material such as fiberglass, plastic, or the like. If the outer cylinder 20 is made of steel or of aluminum of sufficient wall thickness, then the cap 39, which acts as a support collar as will appear, would not be necessary.

The bushing 30 is drivingly wedged into engagement with the ring R by the inner edge of the piston 11. In other words, in the assembly operation of this leg L, the piston is repeatedly forced against the bushing 30, thus driving the bushing into wedging engagement with the ring R, causing the latter to radially expand into binding engagement with the cylinder 20.

The cap 39 protects the cylinder 20 from damage, if the cylinder were made of resilient material such as fiberglass or the like, due to the driving of the bushing tightly into the ring R. That is to say the collar 39 supports the cylinder in the locking area where the cylinder is highly stressed in a radial direction due to the locking taper.

In the above described embodiment of the invention, the degree of taper in the ring R, and of the bushing 30, is such that a self-locking action is produced between the male and female members, i.e., the bushing and ring, respectively.

The amount of taper on the bushing and ring determines just how tightly the bushing will lock in place. For example, it has been found for the above described embodiment of the invention, that a taper of three-fourths of an inch per linear foot is particularly desirable. A taper of less incline will lock more tightly, and a greater degree of taper will provide less severe locking action.

The other tapered, retaining ring R1 between the intermediate cylinder 10 and the tapered bushing 40, is similar to ring R as is its assembly and locking action with bushing 40, and therefore, a detailed description of it is not deemed to be either necessary or desirable. The bushing 40 is similarly impacted into wedging engagement with ring R1 by the piston 1 when the latter is fully extended in its cylinder 10.

With the above construction the leg remains firmly assembled regardless of the extreme vibrations to which it is subjected in drilling rock.

More specifically, when the device is in use, the bushings are continually driven tightly into engagement with their ring due to the cylinder being periodically fully extended. Furthermore, vibration of the rock drills adds to this feeding force.

The present invention eliminates the need for threaded joints which are troublesome in maintaining concentricity between the cylinder and its bushings; it facilitates assembly and disassembly of the parts; it results in a compact, efficient and economical design; and it permits the use of materials for the cylinder, such as fiberglass, plastic or other resilient material, which do not lend themselves to threaded construction.

The invention has been shown in FIGS. 4 and 5 as applied to a steel retainer assembly for a rock drill or the like. Conventionally, these assemblies were made by using socket head screws to hold the assembly in place. However, due to the great number of vibrations to which these parts are subjected, considerable difficulty was encountered in maintaining the parts in tightly assembled relationship. With the present taper-retaining ring construction, the assembly is held intact with substantially no possibility of having vibration of the drill loosen the parts.

The steel retainer shown includes a chuck housing H which forms part of the drill and a steel puller yoke Y is swingable on the two laterally extending projections P AND P1. The yoke supports the drill steel S in the known manner. The housing has a pair of tubular extensions 43 and a plunger 44 is slideably mounted in each extension 43 for selective engagement with a detent 42 or 42a.

The construction of both extensions 43 and their plungers 44 are similar and only one will be described in detail.

When the plunger is in detent 42a, the steel S is retained in the housing. When the yoke is swung about the pivot projections P and P1, to a position where the plungers 44 engage detents 42, then the drill steel can be removed from the housing in the known manner.

The extension 43 has a free end 45 formed with an external taper 43a therearound, which taper converges in an axial direction towards said steel S.

A cylinder 46 has a bore 47 for receiving the tapered, free end 45 of the extension 43, and the cylinder also has an annular groove 48 formed in its bore and adjacent the free end 45.

A retaining ring R2 is located in the groove 48 of the bore of the cylinder 46, and has an internal taper 49 which complements the external taper 43a of the free end 45 which constitutes a generally annular member. The ring R2 is axially split, and an extension 50 of the ring can be grasped by a suitable tool (not shown) to compress the spring and initially insert it in the groove 48.

The spring 51 acts to continually urge the plunger 44 into its appropriate detent 42, and at the same time, the spring also acts to urge the external surface 43a of the tapered member 45 into wedging contact with the internal tapered surface of the locking ring R2. Thus, relative axial movement in one direction between the free end 45 and the ring R2 causes wedging engagement between the end ring and consequent radial expansion of the ring into binding engagement with the cylinder The taper of the ring in this embodiment is sufficiently small so as to also be of the self-locking type which is particularly advantageous in an environment of a rock drill where severe and prolonged vibration occurs.

The embodiment of the invention as shown in FIG. 6 relates to an accumulator which is used with rock drills or the like and illustrates another way in which the invention can be utilized.

The rock drill D with which the present invention is shown only fragmentarily and includes a housing 55 which has a cylinder 56. The cylinder in turn has a bore 57 which in part defines a fluid chamber 58. An end cap 60, which constitutes a generally annular and externally tapered member, is retained by a tapered retaining ring R3 which has an internal tapered surface 62. This tapered surface; 62 complements the external tapered surface 63 of the annular member or cap 60. In this embodiment also, it will be noted that a portion of the ring R3 is adapted to seat in and be held by a groove 65 formed in the bore 57 of the cylinder 67. The ring R3 has an extension 68 which can be readily grasped by the fingers or a suitable tool so as to radially compress the ring for engagement in the groove 65. Piston 70 is slideable in the chamber of the accumulator in the known manner, and gas under pressure is present in chamber 58. For example, nitrogen is often used in this chamber and is under continual pressure so that it holds the annular cap member 60 tightly against the locking ring R3 at all times. Conventional valving 72 is provided as is a fluid port 73 leading to the valve chest.

In this embodiment, the taper of the ring could approach 30° and still exert considerable radial pressure to hold the tapered retaining ring firmly in the groove. With this arrangement, the construction also acts as a safety device sine the accumulator could not be disassembled until the pressure was released. In this embodiment, the angle $\alpha$ is great enough so that is is not of the locking type.

RESUME

The locking rings provided by the present invention could be made of more than one piece and held in more or less loosely assembled relationship in the groove of the cylinder. However, for ease of assembly a single-piece ring is preferred, particularly when the annular space between the parts to be locked is extremely small.

With the present invention, a tapered retaining ring is provided for locking a generally annular and externally tapered member within the bore of a cylinder. The ring is held in a groove in the cylinder, and the ring has a tapered bore which complements the externally tapered member. The taper may be such as to be self-locking or otherwise, depending on its use. The invention finds particular utility in a rock drill application where in use the bushing is continually driven into tight engagement with the locking ring.

I claim:

1. In an assembly comprising an outer annular member, and an inner member concentrically arranged within the outer member: the improvement comprising novel means for rigidly connecting said members together; said connecting means including a groove formed in the inner surface of the outer member and defining opposed locking shoulders spaced a predetermined axial distance from one another; a split ring positioned within the outer member so that the outer section of the ring nests snugly within the aforementioned groove in abutment against the opposed shoulders, thereby precluding axial movement of the ring; said inner member having its outer external surface tapered axially, and said split ring having its internal surface tapered axially, whereby relative axial movement between the inner member and the ring and outer member causes the ring member to wedge tightly between the outer and inner members.

2. The assembly of claim 1 wherein the outer annular member is a fluid cylinder and the inner member is a bushing designed to slidably guide a fluid piston; the bushing having its smaller tapered end exposed to the space beyond the cylinder whereby an axial force on the exposed end of the bushing is effective to break the wedging engagement between the bushing and retaining ring.

3. The assembly of claim 2 wherein the cylinder is formed of fiberglass and the retaining ring is formed of high strength metal.

4. The assembly of claim 3 and further comprising a high-strength sleeve tightly encircling the fiberglass cylinder around the grooved area, whereby said sleeve reinforces the fiberglass against radial strain incident to the wedging action.

5. The assembly of claim 3 wherein the groove in the fiberglass cylinder is a wide shallow groove having a width between the locking shoulders that is many times the groove depth, whereby the back wall of the groove has a substantial area in frictional gripping engagement with the outer face of the ring; the groove construction being such that the fiberglass cylinder is capable of formation from thin wall tubing.

6. The assembly of claim 2 wherein the retaining ring includes an axial extension going beyond the end of the cylinder for being grasped to effect assembly and disassembly of the ring relative to the cylinder.

7. The assembly of claim 1 wherein the outer annular member includes an end wall defining a first spring abutment, and the second inner member includes an inner wall defining a second spring abutment; the combination further comprising a spring compressively trained between the two abutments to provide sufficient relative axial movement between the two members as will effect the aforementioned wedge engagement.

8. The assembly of claim 1 wherein the outer member constitutes one wall of a chamber-defining fluid cylinder; the inner member constituting one wall of a cap which closes the cylinder chamber; the direction of taper on the retaining ring and inner member being such that pressurization of the chamber increases the aforementioned wedge engagement.